F. J. SAVAGE.
MECHANICAL PLOW LIFT.
APPLICATION FILED SEPT. 7, 1912.
1,073,636.
Patented Sept. 23, 1913.
5 SHEETS—SHEET 1.
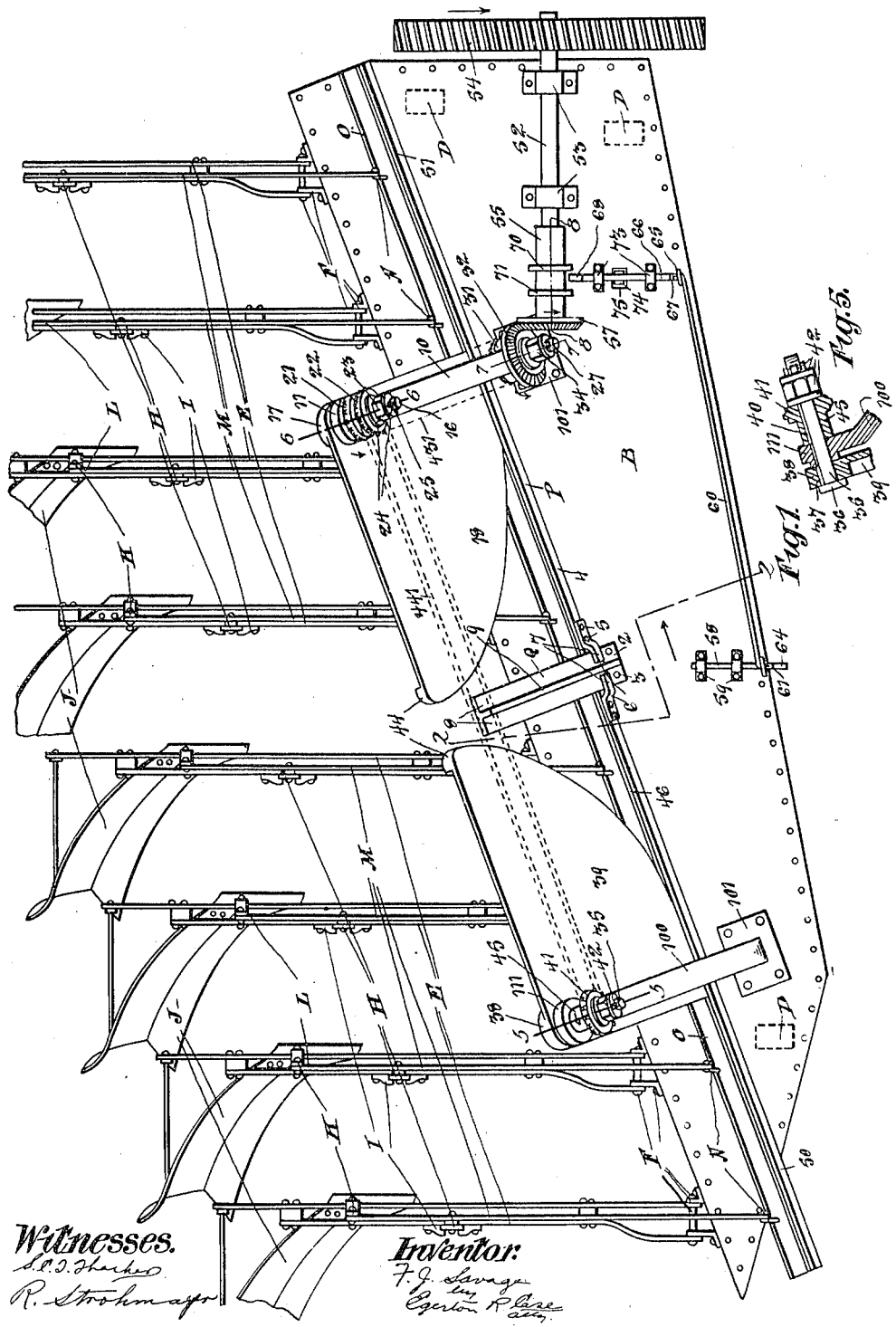
Witnesses.
Inventor:
F. J. Savage F. J. SAVAGE.
MECHANICAL PLOW LIFT.
APPLICATION FILED SEPT. 7, 1912.
1,073,636.
Patented Sept. 23, 1913.
5 SHEETS—SHEET 2.
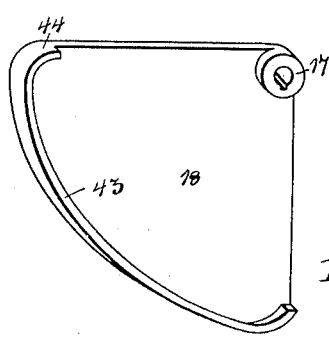
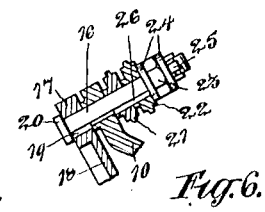
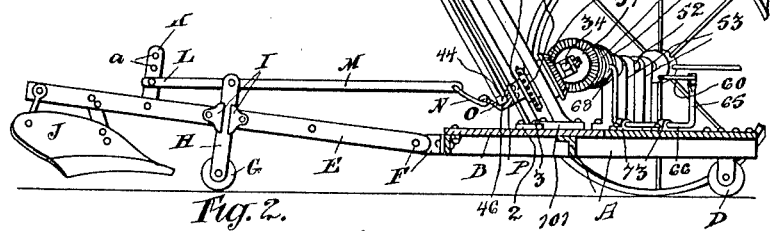
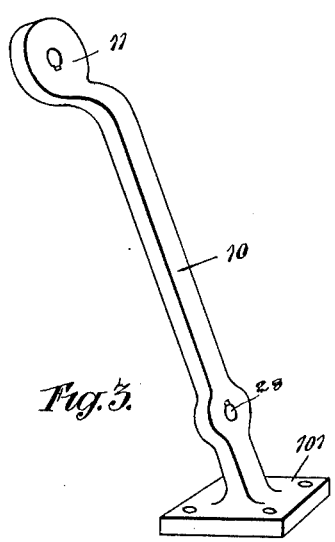
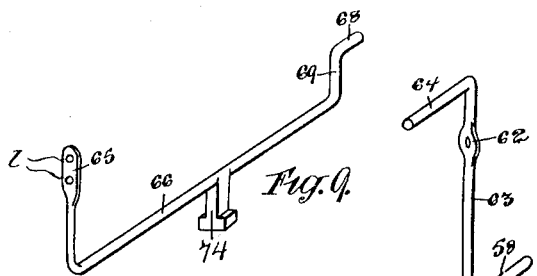
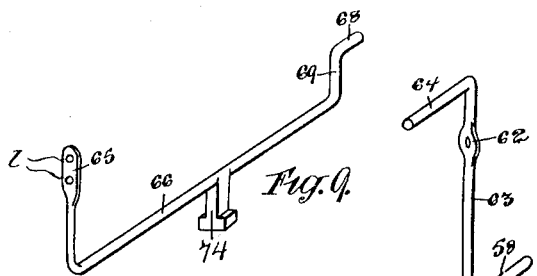
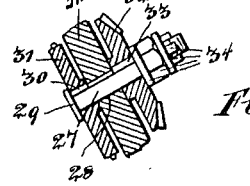

F. J. SAVAGE.
MECHANICAL PLOW LIFT.
APPLICATION FILED SEPT. 7, 1912.
1,073,636.
Patented Sept. 23, 1913.
5 SHEETS—SHEET 3.
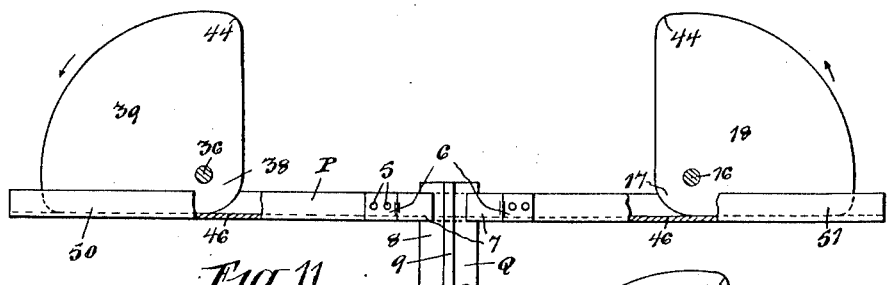
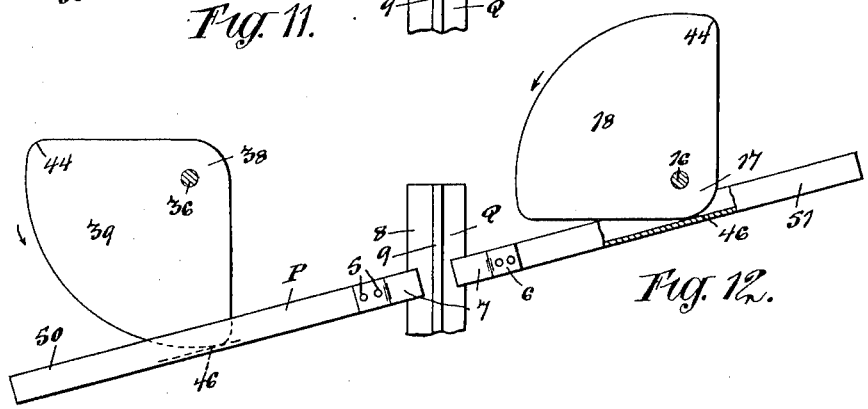
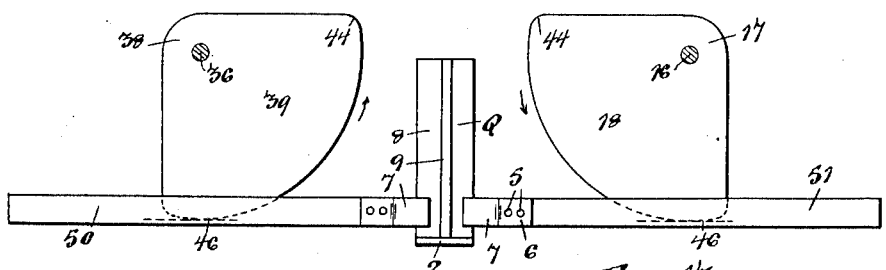
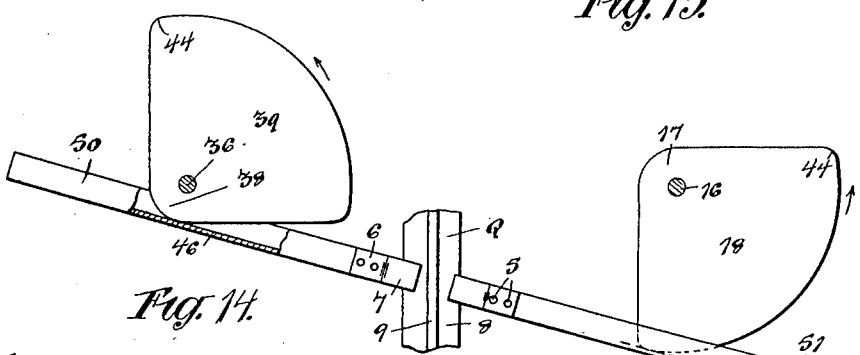
Witnesses.
Inventor.

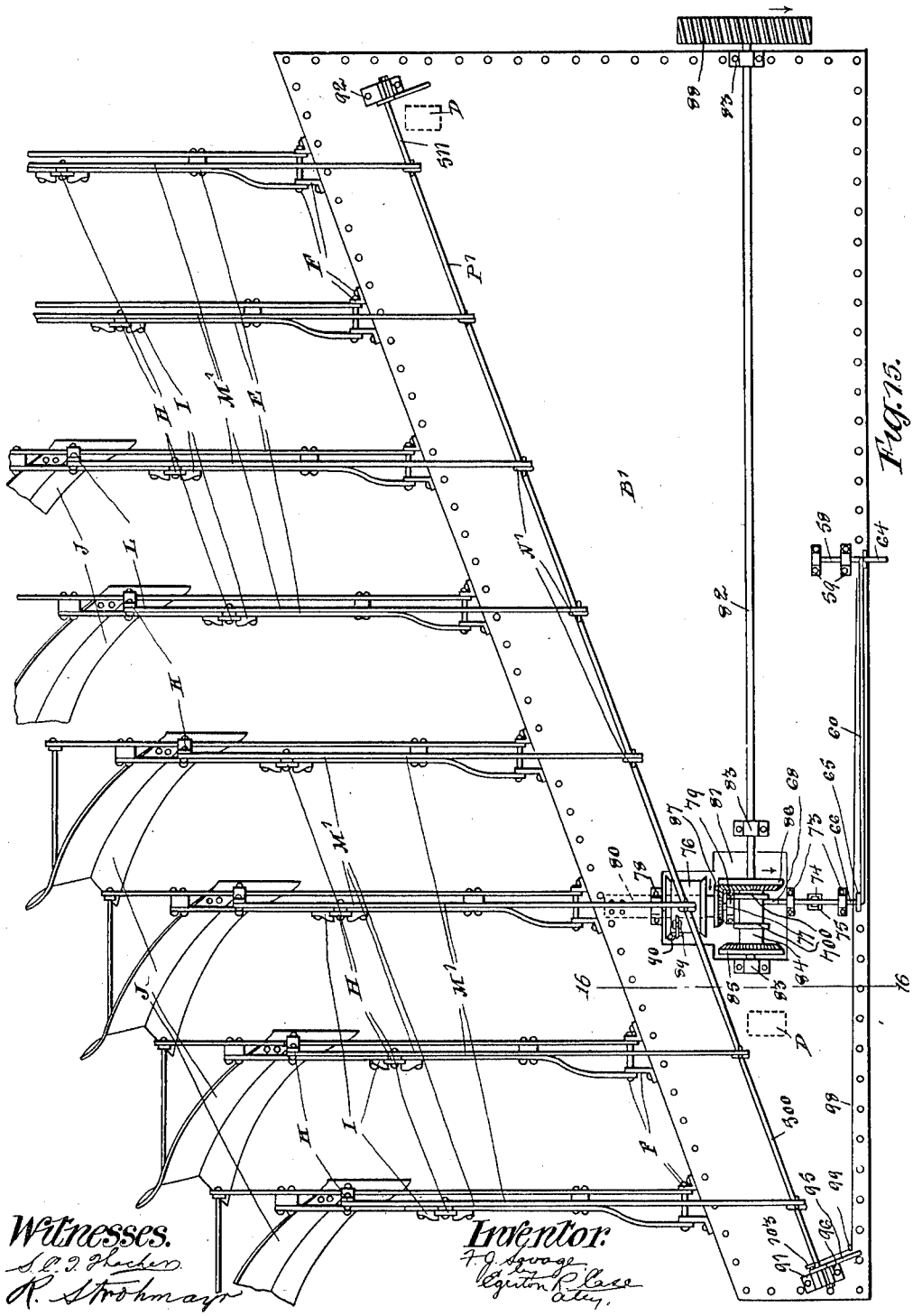

F. J. SAVAGE.
MECHANICAL PLOW LIFT.
APPLICATION FILED SEPT. 7, 1912.

1,073,636.

Patented Sept. 23, 1913.
5 SHEETS—SHEET 5.

Witnesses.

Inventor.

UNITED STATES PATENT OFFICE.

FREDERICK JAMES SAVAGE, OF FORD, SASKATCHEWAN, CANADA, ASSIGNOR OF ONE-THIRD TO CHRISTOPHER JAMES LUTES, OF TISDALE, CANADA.

MECHANICAL PLOW-LIFT.

1,073,636.               Specification of Letters Patent.     Patented Sept. 23, 1913.

Application filed September 7, 1912. Serial No. 719,062.

*To all whom it may concern:*

Be it known that I, FREDERICK JAMES SAVAGE, of the town of Ford, Province of Saskatchewan, Canada, a subject of the King of Great Britain, have invented certain new and useful Improvements in Mechanical Plow-Lifts, of which the following is a specification.

My invention relates to improvements in mechanical plow-lifts, and relates more particularly to that class of plow drawn by a traction-engine, and the principal object of my invention is to design a power-lift whereby the plows can be mechanically raised and lowered without the necessity of employing a man for that purpose.

A still further object of my invention is to position the levers whereby the means for raising and lowering the plows are put into operation by the driver of the tractor, so that he may readily manipulate the mechanism without moving from his position on the tractor, and broadly considered, my invention consists of a tilting-bar to which is coupled the levers of the different plows, the said bar being mounted on a suitable frame which is mounted on suitable wheels; means carried by said frame and coacting with said tilting-bar so that the plows can be raised and lowered mechanically as the operator desires, and means for operating the said means for controlling the movement of said tilting-bar, as hereinafter more particularly set forth.

Figure 16:
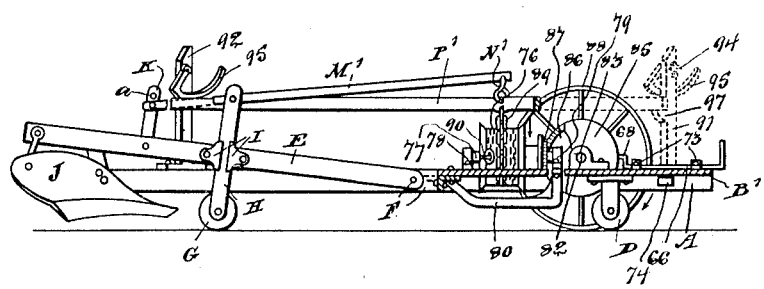
Figures 17, 18:
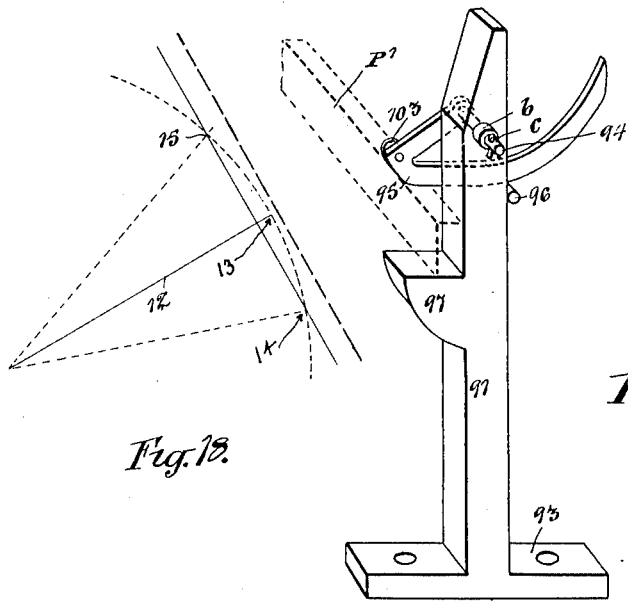

Figure 1 is a plan view of the major portion of a gang-plow, showing in perspective the major portion of my preferred form of construction for manipulating the plows. Fig. 2 is a vertical cross section on the line 2—2, Fig. 1, only one plow-share and its connected parts being shown, for clearness of illustration. Fig. 3 is a perspective view of one of the standards used in my preferred form of implement. Fig. 4 is a perspective view of one of the sectors used in my preferred form of implement. Fig. 5 is a vertical longitudinal section on the line 5—5, Fig. 1. Fig. 6 is a vertical longitudinal section on the line 6—6, Fig. 1. Fig. 7 is a vertical longitudinal section on the line 7—7, Fig. 1, on an enlarged scale. Fig. 8 is a vertical longitudinal section on the line 8—8, Fig. 1, on an enlarged scale. Figs. 9 and 10 are perspective views of the levers for throwing the mechanism into and out of gear. Figs. 11, 12, 13 and 14 are diagrammatic views showing the different positions of the tilting-bar and its operating sectors. Fig. 15 is a plan view of the major portion of a gang-plow showing a plan view of an alternative form of construction for raising and lowering the plow-shares. Fig. 16 is a cross section on the line 16—16, Fig. 15, only one plow-share and its connected parts being shown, for clearness of illustration. Fig. 17 is a perspective view of one of the standards used in my alternative form of construction whereby one end of the tilting-bar in this form is locked, and Fig. 18 is a diagrammatic view showing the points where the rear edge of the tilting-bar intersects the arcs described by the levers for raising and lowering the plows.

In the drawings like characters of reference indicate corresponding parts in each figure.

My preferred form of invention is designed to be incorporated with a plow as the same is being built. In both forms of my invention, the operation of elevating the plows consists in first depressing that end of the tilting-bar which is attached to the lever of the leading-plow until the share is fully lifted out of the ground. When the said first share is fully lifted, the immediately-succeeding share, or the second share, is just above the ground, the third share just leaving the ground, the fourth share nearing the surface, and so on. Immediately the said leading end of the tilting-bar is depressed, the depressing movement progressively travels to the other end of the tilting-bar until the same is in a horizontal position (see Figs. 1 and 13) when every share is lifted.

The proportions of the various parts will be such that the traveling plow-shares will make a smooth slanting exit from the ground in place of the rough break made by the hand-lifted plow.

In Fig. 11 is shown diagrammatically the position of the tilting-bar and its associated sectors when the plows are in the ground. Fig. 12 shows the position of the tilting-bar and its associated sectors when the leading-end of the tilting-bar is first depressed, and consequently the plows controlled by this end of the tilting-bar are being gradually lifted, the movement progressively continuing to the other end of the tilting-bar until the plows are lifted clear of the ground, when the said tilting-bar and its sectors occupy the position illustrated in Fig. 13. In Fig. 14 is shown diagrammatically the position of the tilting-bar and its sectors when the plows are being moved into the ground. The forward or leading end of the tilting-bar is elevated to its highest point and this lifting movement progressively continues to the other end of the tilting-bar until the same assumes the horizontal position illustrated in Fig. 11, when all of the plows are in the ground.

The frame for the plows is constructed after any suitable manner, and the same consists of bars A to which is secured the platform B. Any suitable wheels D are carried by the said frame. The plow-frames E are of any suitable construction, and the same are hinged to the frame by any suitable hinged connections designated by the common letter of reference F. The said frame is of course provided with suitable means (not shown) whereby the same is coupled to the tractor. The plow-frames E, in the construction illustrated, are each provided with a gage-wheel G which is journaled in the gage-bar H which has longitudinal movement between the brackets I carried by the plow-frames E, and the said plow-frames.

J are any suitable plows suitably carried by the plow-frames E, and each plow-frame is provided with a bracket K having a plurality of holes, in which the rear end L of each lever M is journaled.

N is a link-connection flexibly connecting the front end of each lever M to the rear-flange O of the tilting-bar P which in this form is preferably U-shaped in cross section. This tilting-bar is held in relationship to the frame so that it may have the required movements, by any suitable means. My preferred means for retaining the said tilting-bar in position consists of a standard Q provided with a suitable base 2 which is secured by the bolts or other fastening-means 3 to the said frame. Secured to the front flange 4 of the tilting-bar P by the screws or bolts 5, and one on each side of the standard Q, are plates 6, the inner portions 7 of which overlap the side flanges 8 of said standard Q. This standard is preferably T-shaped in cross section, and the flange 9 thereof projects between the inner ends of the inner portions 7. As will be hereinafter more clearly understood, the said standard Q or its equivalent prevents the tilting-bar P from being pushed sidewise by the action of the sectors. Upon referring particularly to Figs. 11 to 14, it will be seen that the portions 7 of the plates 6 are so positioned as to allow freedom of movement of the said tilting-bar without any danger of the same binding against said standard.

10 and 100 are standards provided with bases 101 which are suitably secured to the frame already mentioned to which the plow-frames E are hinged. The heads 11 and 111 of said standards are off-set so as to occupy a position behind or to the rear of said standards. The said standards as well as the standard Q, occupy the angular position shown very clearly in Fig. 2, and the bases of these parts of course are positioned at an angle to the said standards. By reason of the position of the said standards, the tilting-bar P occupies the position shown in Fig. 2, so that the tilting-bar, although its rear edge will intersect the arcs described by the ends of the said levers, will not conflict therewith. This will be clearly seen upon referring to Fig. 18. The free ends of the said levers, at the middle of their movement, as shown by the line 12 where it bisects the arc 13, project over the rear edge of the tilting-bar P. Only at the points 14 and 15 will the rear edge of the tilting-bar P intersect the arc described by each of the levers M. Therefore it will be understood that in order to raise and lower the said plows through the medium of the said levers M by my preferred form of construction, the standards 10, 100 and Q and their associated parts must occupy the position clearly shown in Fig. 2. The dotted line parallel with the full line intersecting the arc 13 in Fig. 18, represents the plane of the sectors, and therefore it must be understood that the levers M do not project through the plane of motion of the said sectors, although they do project through the plane of motion of the rear edge of the tilting-bar P, as described.

16 is a shaft journaled in the head 11 of the standard 10. This shaft 16 passes through the hub 17 of the sector 18, and these parts are keyed together by the key 19. 20 is the head of the said shaft which is shaped as shown so as to positively prevent the longitudinal displacement of the said shaft. Keyed to said shaft and in front of the head 11 are a pair of sprocket-wheels 21 and 22 of the same size. Any suitable retaining means may be employed to prevent displacement of the parts just described in the head 11. This means may consist of a nut 23 screwed on the threaded end of said shaft, and positioned between the washers 24. 25 is a split pin passing through the threaded end of said shaft and whereby the parts already described are permanently held in relationship. 26 is a key keying the sprocket-wheels 21 and 22 to the said shafts.

27 is a shaft which is journaled in the hole 28 formed in the standard 10. This shaft is provided with a head 29 and keyed to this shaft adjacent said head by a key 30 is a sprocket-wheel 31.

32 is a beveled-gear wheel keyed by the key 33 to the shaft 27, and adjacent the front side of said standard 10. The said wheels and shaft are permanently retained in position by any suitable means, such as the washers and nut and split pin designated by the common numeral of reference 34. This is a construction already clearly described.

Journaled in the head 111 of the standard 100 is a shaft 35 provided with a head 36. Keyed to this shaft adjacent said head of the key 37 is the hub 38 of the sector 39. Keyed to the shaft 35 by the key 40 is a sprocket-wheel 41, which operates adjacent the forward or front side of the head 111 of the standard 100.

The parts just described are permanently retained in relationship by the washers and nut and split pin designated by the common numeral of reference 42, or equivalent means. The sectors 18 and 39 are of the same size, and they are rotated in the same direction and at the same speed. Each of the said sectors is provided with a tread 43 having rounded ends 44, and the said treads conform to an arc, the radius of which is concentric to the axes of the shafts 16 and 35. The sprocket-wheels just described are all of the same size.

431 is a sprocket-chain connecting the sprocket-wheel 31 with the sprocket-wheel 21, and 441 is a sprocket-chain connecting the sprocket-wheel 22 with the sprocket-wheel 41. The sprocket-wheel 41 is provided with a hub 45 which operates against the head 111 of the standard 100, and so positions this said sprocket-wheel that it will be in alinement with the sprocket-wheel 22. By means herein after described, the beveled-gear wheel 32 is operated in the direction indicated by arrow, and through the parts already described the said sectors are moved around their respective shafts. The tread 43 of each sector operates against the floor 46 of the tilting-bar T, and it is through the coaction of the tread of each sector with the floor of the said tilting-bar that the said tilting-bar is depressed.

In the position of the parts illustrated in Figs. 1, 2 and 13, the plows are all elevated. Now the gear for operating the sectors may be uncoupled so that these parts can not move and so consequently they will occupy the position illustrated in the described figures thus keeping the plows out of the ground. Now to cause the plows to engage again, the operator throws the wheel hereinafter described into mesh with the wheel 32, and consequently the sectors 18 and 39 progressively occupy the positions illustrated respectively in Figs. 14 and 11, thereby permitting the plows to fully engage in the ground. When the sectors occupy the positions illustrated in Fig. 11, the sectors are brought to rest until it is desired to again operate them. As the sector 39 moves from the position illustrated in Fig. 13 into the position illustrated in Fig. 14, one of the levers M nearest the forward or leading end 50 of the tilting-bar, and the other levers in rotation, through the weight of the plow-frames and plows, move upward in varying distances and so elevate the said end 50, and the plows at this end of the said tilting-bar progressively fully engage in the ground. Since the sector 18 continues to revolve, the rest of the levers M are in like manner elevated, and therefore the said tilting-bar P ultimately assumes the position shown in Fig. 11 when all the plows are in the ground. It will now be clear that when the tread 43 of each sector moves out of contact with the floor 46 of the tilting-bar, there will be nothing to hold the levers M down, and consequently the weight of the plows and the plow-frames will raise the tilting-bar up with the result already mentioned. The floor 46 of the tilting-bar P cannot rise any higher than the hubs of the said sectors. Without further description it will be understood that the said plows as gradually pass into the ground as they pass out of the same. And when the plows are again to be raised out of the ground, the sector 39 (see Fig. 12) will tilt the rear or following end 51 of the tilting-bar P, and in due course the sector 18 will occupy the position illustrated in Fig. 13, thus tilting the forward or leading end 50 of the said tilting-bar until the plows are out of the ground and the tilting-bar occupies the position illustrated in Fig. 13.

From the foregoing description of the drawings, it will be understood that the tilting-bar moves longitudinally on the standard Q. Fig. 11 shows this tilting-bar at its highest position, and Figs. 1 and 13 show it in its lowest position. The standards 10 and 100 are off-set as illustrated and described, so that the pairs of sprocket-wheels already mentioned will be held in alinement.

The mechanism for operating the sectors 18 and 39 and associated parts, consists of a shaft 52 which is mounted in bearings 53 carried by the platform B.

54 is a wheel keyed to the shaft 52, and as this wheel operates on the ground, it is the source of power for operating the sectors.

55 is a sleeve splined by means of the key and keyway designated by the common numeral of reference 56, on the shaft 52. Keyed to the sleeve 55 by the key 560 is a beveled-gear wheel 57 which is so positioned as to coact with the beveled-gear wheel 32 at the will of the operator.

58 is a lever held in the bearings 59 carried by the platform B.

60 is a rod, the end 61 of which passes through the hole 62 formed in the upright-portion 63 of the lever 58.

To throw the gear-wheel 57 out of mesh with the gear-wheel 32, the operator presses his foot against the handle 64 of the lever 58, and as the rod 60 is pivoted in the upright-portion 65 of the lever 66 by its end 67, which is held in one of the holes $l$, and as the nose 68 of the upright-portion 69 of the said lever rests adjacent the flange 70 of the sleeve 55, the said sleeve and its sprocket-wheel are moved to the right and so the said gearing is uncoupled. To couple the gearing, the parts before described are moved in the opposite direction, thus bringing the nose 68 in contact with the flange 71 of the sleeve 55, thus moving the gear-wheel 57 into mesh with the gear-wheel 32. The lever 66 is held in bearings 73 carried by the platform B. In order to maintain the operating parts for the sleeve 55 in vertical position so that the nose 68 will not accidentally engage with either of the flanges 70 and 71, at the wrong time, I provide the said lever 66 with a depending weight 74 which operates through a hole 75 formed in the platform B. This weight will keep the said upright portions of the said levers in vertical position for the purpose set forth.

Upon referring particularly to Fig. 2 it will be noticed that the flange O of the tilting-bar P is formed to extend at an outward angle. This flange is so shaped as to permit the levers M to be coupled to the said tilting-bar so that they will not project over the floor 46 of said tilting-bar, and therefore will not be in the path of movement of the sectors.

If it is desired to regulate the depth of the plowing, the rear ends L of the levers M may be secured in the desired one of the holes $a$, as will be understood without further description.

Since the ends 44 of the tread 43 of each sector are rounded, and since the outer configuration of the hubs of said sectors are also rounded, and since the said sides of the said sectors are substantially at right-angles to each other, the said sides occupy a tangential position in respect of the said ends and the said hub, of each of the said sectors. Of course the perimeter of the tread 43 of each sector is concentric to the axis of the shaft on which the said sector is mounted.

I shall now describe my alternative form of construction. This alternative form of construction is designed to be attached to existing plows without the necessity of altering the construction of the plows. The tilting lever $P^1$ is coupled to the levers $M^1$ by the usual link $N^1$, and the free ends of these levers operate above the said tilting-bar. In the alternative form of construction, the plows are illustrated as raised out of the ground, and the tilting-bar $P^1$ is of course then in its lowermost position.

76 is a flanged-drum keyed to the shaft 77 which is held at one end in the bearings 78 carried by the platform $B^1$. The other end of this shaft is journaled in the bearing 79 which is supported by the bracket 80, or equivalent means, which is secured after any suitable manner to the platform $B^1$. Since the said drum and the gearing hereinafter described preferably rest in part below the top of the platform $B^1$ in order to give the tilting-bar in this form the greatest possible range of movement, I of necessity must form an opening 81 in said platform and consequently I utilize the bracket 80 to support the bearing 79.

82 is a shaft journaled in the bearings 83 carried by the platform $B^1$. Splined on this shaft is a sleeve 84.

85 is a beveled-gear wheel secured to one end of said sleeve, and 86 is a beveled-gear wheel secured to the other end of said sleeve. The beveled-gear wheel 86 is shown in engagement with the beveled-gear wheel 87 keyed to the shaft 77 of the drum 76, and as the shaft 82 is rotated by the power-wheel 88, the plows are lifted out of the ground as illustrated in Fig. 16. By means hereinafter described, the beveled-gear 86 is thrown out of mesh with the beveled-gear 87. In order to engage the plows again in the ground, the beveled-gear wheel 85 is moved into mesh with the beveled-gear wheel 87, thus turning the said drum in the opposite direction permitting the plows to be engaged. When the said plows are all engaged, the beveled-gear wheel 85 is moved out of mesh with the beveled-gear wheel 87, as will be understood. The tilting-bar $P^1$ is connected by a chain 89 with the coupling-ring 90 or other suitable means carried by the drum 76. This chain is wound around the said drum in the position of the parts illustrated, and when the plows are in the ground the said chain is of course unwound from the drum. The chain 89 is coupled to the tilting-bar $P^1$ at a point approximately one-third of the length thereof, measured from the forward or leading end 500.

91 and 92 are standards each provided with a base 93 which is suitably secured to the platform $B^1$.

94 is a rod mounted in the upper end of each of the said standards, and keyed to one end of each of these rods is a locking-arm 95 which is provided with a stop-pin 96 which normally rests in contact with its associated standard to prevent the said arms from moving too far inward, so that they will automatically occupy the positions shown in Figs. 16 and 17 which is above the position occupied by the tilting-bar $P^1$ when the plows are raised.

The operating gear already described for the drum 76 draws down the leading or forward end 500 of the tilting-bar first, and this end will come in contact with the locking-arm carried by the standard 91 and will move it so that ultimately the said locking-bar will rest against the lug 97 carried by the said standard, and thus be brought to rest. The operation of the drum will continue to depress the tilting-bar until the rear or following end 511 thereof will escape by the locking-arm carried by the standard 92. The standard 92 is not provided with a lug, and a stop for this end of the tilting-bar to allow for a possible overwinding of the drum and its gearing. When the said tilting-bar is in the position illustrated particularly in Fig. 16, the drum is of course brought to rest by the operator throwing the operating gearing therefor out of mesh with the gear-wheel thereof. The said locking arms are so constructed that they will automatically occupy the positions illustrated in Figs. 16 and 17.

In order to raise the tilting-bar P¹ so as to move the plows into the ground, the operator pulls a release-cord 98 which passes under the staple 99 and is connected to the headed pin 103 carried by the locking-arm 95 associated with the standard 91, and at the same time he throws the beveled-gear wheel 85 into mesh with the beveled-gear wheel 87 and so operates the said drum to permit the weight of the plows and connected parts to raise up the forward or leading end of the said tilting-bar. So soon as the said forward or leading end has reached the limit of its upward movement, the said tilting-bar will have attained such an angle that the following end 511 thereof will slip from under its locking-arm. The action of the plows already in the ground will insure the complete lowering of the other plows. The gearing for unwinding the drum of course continues in operation until the said tilting-bar has reached its highest point, when the operator throws it out of gear. The sleeve 84 is provided with the flanges 700 with which coacts mechanism already described in connection with the preferred form whereby this sleeve and its gear-wheels are operated as desired.

$b$ is a washer mounted on the outer end of each of the rods 94 and $c$ is a split pin passing through the said rods thereby retaining the same in place.

While I have described what I consider to be the best embodiment of my invention, I desire it to be understood that the principles can be embodied in different forms, and I desire not to be limited beyond the requirements of the prior art, and the terms of my claims.

What I claim as my invention is:

1. In a gang-plow, the combination with a suitable frame; a plurality of plow-frames hinged thereto; the plows carried by said plow-frames, and a lever associated with each plow-frame for raising and lowering the same, of a bar to which the said levers are hinged, and means under the control of the operator whereby said bar is progressively depressed, commencing at the leading or forward end thereof in order to progressively elevate said plows through the medium of said levers, and whereby said bar is permitted to progressively move upward, such upward movement commencing at the leading or forward end thereof, and progressively continuing until said bar is substantially horizontal and all the plows are engaged, as set forth.

2. In a gang-plow, the combination with a suitable frame; a plurality of plow-frames hinged thereto; the plows carried by said plow-frames, and a lever associated with each plow-frame for raising and lowering the same, of a bar to which the said levers are hinged; means under the control of the operator whereby said bar is progressively depressed, commencing at the leading or forward end thereof in order to progressively elevate said plows through the medium of said levers, and whereby said bar is permitted to progressively move upward, such upward movement commencing at the leading or forward end thereof, and progressively continuing until said bar is substantially horizontal and all the plows are engaged, and means carried by said frame for maintaining said bar in coöperative position in respect of said levers, as set forth.

3. In a gang-plow, the combination with a suitable frame; a plurality of plow-frames hinged thereto, the plows carried by said plow-frames, and a lever associated with each plow-frame for raising and lowering the same, of a tilting-bar to which the free ends of said levers are hinged; a standard carried by said frame and supported at the desired backward angle; means carried by said tilting bar and engaging the said standard in such a manner as to permit the free tilting-movement of the said bar on said standard and its movement longitudinally thereof, and means under the control of the operator whereby the said tilting-bar is depressed, after the manner stated, to progressively elevate said plows through the medium of said levers, and which means operate to permit the said tilting-bar to operate as described to permit the said levers to progressively move upward and so progressively lower said plow-frames, for the purpose specified.

4. In a gang-plow, the combination with a suitable frame; a plurality of plow-frames hinged thereto, the plows carried by said plow-frames, and a lever associated with each plow-frame for raising and lowering the same, of a tilting-bar to which the free ends of said levers are hinged; a standard carried by said frame and supported at the desired backward angle; means carried by said tilting-bar and engaging the said standard in such a manner as to permit the free tilting-movement of the said bar on said standard and its movement longitudinally thereof; a pair of standards carried by said frame and one on each side of said first-mentioned standard, the heads of said last-mentioned standards being off-set to rest behind the same, the said standards being supported at the desired backward angle; a shaft mounted in the head of each of the said second-mentioned standards; a sector keyed to each of the said shafts and coacting with said tilting-bar as described; means whereby when one of said sectors is rotated the other sector is also rotated and in the same direction and at the same speed, and means under the control of the operator whereby said sectors are moved and brought to rest in order to coact with said tilting-bar and the levers connected therewith in order that the said plows may be raised and lowered and held in raised position, as set forth.

5. In a gang-plow, the combination with a suitable frame; a plurality of plow-frames hinged thereto; the plows carried by said plow-frames, and a lever associated with each plow-frame for raising and lowering the same, of a tilting-bar U-shaped in cross section to the rear flange of which the free ends of the said levers are hinged; a standard carried by said frame and supported at the desired backward angle, means carried by the front flange of said tilting-bar and engaging the said standard in such a manner as to permit the free tilting-movement of the said bar on said standard and its movement longitudinally thereof; a pair of standards carried by said frame and one on each side of said first-mentioned standard, the heads of said last-mentioned standards being off-set to rest behind the same, the said standards being supported at the desired backward angle; a shaft mounted in the head of each of the said second-mentioned standards; a sector keyed to each of the said shafts, and each provided with a tread concentric to its axis of rotation, the said tread of each sector coacting with the floor of said tilting-bar as described, means whereby when one of said sectors is rotated the other sector is also rotated and in the same direction and at the same speed, and means under the control of the operator whereby said sectors are moved and brought to rest in order to coact with said tilting-bar and the levers connected therewith, in order that the said plows may be raised and lowered and held in raised position, as set forth.

6. In a gang-plow, the combination with a suitable frame; a plurality of plow-frames hinged thereto; the plows carried by said plow-frames, and a lever associated with each plow-frame for raising and lowering the same, of a tilting-bar U-shaped in cross section to the rear flange of which the free ends of the said levers are hinged; a standard carried by said frame and supported at the desired backward angle, means carried by the front flange of said tilting-bar and engaging the said standard in such a manner as to permit the free tilting-movement of the said bar on said standard and its movement longitudinally thereof; a pair of standards carried by said frame and one on each side of said first-mentioned standard, the heads of said last-mentioned standards being off-set to rest behind the same, the said standards being supported at the desired backward angle; a shaft mounted in the head of each of the said second-mentioned standards; a sector keyed to each of the said shafts, and each provided with a tread concentric to its axis of rotation, the said tread of each sector coacting with the floor of said tilting-bar as described; a pair of sprocket-wheels keyed to one of said shafts; a sprocket-wheel keyed to the other of said shafts; a sprocket-chain connecting one of said pair of sprocket wheels with the sprocket-wheel keyed to said other shaft; a shaft journaled near the lower end of the standard provided with the said pair of sprocket-wheels; a sprocket-wheel keyed to this last-mentioned shaft; a sprocket-chain connecting the last-mentioned sprocket-wheel with the inner-placed sprocket-wheel of said pair of sprocket-wheels; a beveled-gear wheel keyed to said last-mentioned shaft and positioned beyond the forward side of its associated standard; a shaft mounted in bearings carried by said frame; a power-wheel keyed to said shaft and operating on the ground; a sleeve splined on said last-mentioned shaft, and provided at its inner end with a beveled-gear wheel which coacts with said other beveled-gear wheel at certain times; a pair of flanges carried by said sleeve and spaced apart, and means under the control of the operator whereby said sleeve is moved through the medium of said flanges to operate said last-mentioned beveled-gear wheel to cause it to coact with the first-mentioned gear-wheel, the whole being arranged to operate as set forth.

In testimony whereof I have affixed my signature in presence of two witnesses.

FREDERICK JAMES SAVAGE.

Witnesses:
ERNEST WALTER MIDELTON,
W. E. MOORE.

---

Copies of this patent may be obtained for five cents each, by addressing the "Commissioner of Patents, Washington, D. C."